United States Patent
Abusleme et al.

(10) Patent No.: US 9,701,766 B2
(45) Date of Patent: Jul. 11, 2017

(54) HYDROPHILIC VINYLIDENE FLUORIDE POLYMERS

(75) Inventors: Julio A. Abusleme, Saronno (IT); Roberto Biancardi, Bellinzago Lombardo (IT); Fabien Roblot, Chenove (FR); Anna Maria Bertasa, Cesate (IT); Giulio Brinati, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 52 days.

(21) Appl. No.: 13/995,454

(22) PCT Filed: Dec. 13, 2011

(86) PCT No.: PCT/EP2011/072508
§ 371 (c)(1),
(2), (4) Date: Jun. 18, 2013

(87) PCT Pub. No.: WO2012/084580
PCT Pub. Date: Jun. 28, 2012

(65) Prior Publication Data
US 2013/0267622 A1    Oct. 10, 2013

(30) Foreign Application Priority Data
Dec. 22, 2010   (EP) .................................. 10196420

(51) Int. Cl.
| | | |
|---|---|---|
| *C08F 14/22* | (2006.01) | |
| *B01D 71/32* | (2006.01) | |
| *B01D 71/78* | (2006.01) | |
| *C08F 214/22* | (2006.01) | |
| *C08F 251/02* | (2006.01) | |
| *C08F 290/02* | (2006.01) | |
| *C08F 290/10* | (2006.01) | |
| *C08F 8/00* | (2006.01) | |

(52) U.S. Cl.
CPC ............. *C08F 14/22* (2013.01); *B01D 71/32* (2013.01); *B01D 71/78* (2013.01); *C08F 8/00* (2013.01); *C08F 214/225* (2013.01); *C08F 251/02* (2013.01); *C08F 290/02* (2013.01); *C08F 290/10* (2013.01); *B01D 2323/38* (2013.01)

(58) Field of Classification Search
CPC .... B01D 71/32; B01D 71/78; B01D 2323/38; C08F 14/22; C08F 214/225; C08F 251/02; C08F 290/02; C08F 290/10; C08F 8/00
See application file for complete search history.

(56) References Cited

U.S. PATENT DOCUMENTS

| | | | |
|---|---|---|---|
| 3,574,178 A | 4/1971 | Toyoda et al. | |
| 3,780,007 A | 12/1973 | Stallings | |
| 3,781,265 A | 12/1973 | Dohany | |
| 4,883,850 A | 11/1989 | Craig | |
| 4,917,885 A * | 4/1990 | Chiba ................. | A61K 9/4816 206/530 |
| 5,145,921 A | 9/1992 | Lasson | |
| 5,283,302 A | 2/1994 | Wakamori et al. | |
| 5,292,816 A | 3/1994 | Metz et al. | |
| 6,277,937 B1 | 8/2001 | Duvalsaint et al. | |
| 6,867,273 B2 | 3/2005 | Lannuzel et al. | |

FOREIGN PATENT DOCUMENTS

| | | |
|---|---|---|
| EP | 0417585 A1 | 3/1991 |
| EP | 0893457 A1 | 1/1999 |
| GB | 1509404 A | 5/1978 |
| WO | WO 2008129041 A1 | 10/2008 |

OTHER PUBLICATIONS

Meng, F., et al—"Recent advances in membrane bioreactors (MBRs): Membrane fouling and membrane material", 2009, Water Research, Apr. 2009, vol. 43, Issue No. 6, pp. 1489-1512, http://dx.doi.org/10.1016/j.watres.2008.12.044 —Elsevier Ltd; 24 pgs.
Liu F., et al—"Preparation of hydrophilic and fouling resistant poly(vinylidene fluoride) hollow fiber membranes", 2009, Journal of Membrane Science, vol. 345, pp. 331-339—Elsevier BV; 9 pgs.
ASTM D445-06—"Standard Test Method for Kinematic Viscosity of Transparent and Opaque Liquids (and Calculation of Dynamic Viscosity[1])", 2006, ASTM International, Copyright A00564222, Oct. 8, 2009; 10 pgs.
Mu, C., et al—"Remarkable improvement of the performance of poly(vinylidene fluoride) microfiltration membranes by the additive of cellulose acetate", 2010, Journal of Membrane Science, Mar. 15, 2010, vol. 350, Issue Nos. 1-2, pp. 293-300—Elsevier B.V.; 8 pgs.

* cited by examiner

*Primary Examiner* — Irina S Zemel

(57) ABSTRACT

The present invention pertains to a process for the manufacture of a grafted fluorinated polymer comprising at least one grafted side chain comprising one or more glycosidic recurring units [polymer (F)], said process comprising polymerizing:
vinylidene fluoride (VDF),
optionally, one or more other fluorinated monomers [monomers (F)], and
optionally, one or more (meth)acrylic monomers [monomers (MA)],
in the presence of at least one polysaccharide derivative [derivative (P)], said polysaccharide derivative having a dynamic viscosity of less than 15 mPaxs, as measured according to ASTM D445 at 20° C. in an aqueous solution at a concentration of 2% by weight,
and by further providing novel polymers (F) as defined above.

15 Claims, No Drawings

HYDROPHILIC VINYLIDENE FLUORIDE POLYMERS

CROSS-REFERENCE TO RELATED APPLICATIONS

This application is a U.S. national stage entry under 35 U.S.C. §371 of International Application No. PCT/EP2011/072508 filed Dec. 13, 2011, which claims priority to European application No. 10196420.3 filed on Dec. 22, 2010, the whole content of this application being incorporated herein by reference for all purposes.

TECHNICAL FIELD

The invention pertains to hydrophilic vinylidene fluoride polymers, to a process for the manufacture of said polymers and to use of said polymers for the manufacture of hydrophilic membranes.

BACKGROUND ART

Poly(vinylidene fluoride) membranes have been widely applied in many areas including low pressure water treatments, microfiltration, ultrafiltration, nanofiltration and distillation, thanks to the outstanding chemical, thermal and mechanical stability of poly(vinylidene fluoride).

Nevertheless, poly(vinylidene fluoride) membranes may suffer certain disadvantages in these applications because of their hydrophobic nature and thus their poor wettability.

Especially when treating aqueous solutions containing suspended solids, because of the low surface energy of PVDF, these materials tend to be adsorbed onto the surface and into the pores of the PVDF membrane, thus causing fouling. The extent of adsorption is generally believed to depend on the foulant-membrane interactions such as hydrophilic/hydrophobic interactions, hydrogen bonding, van der Waals interactions and electrostatic effects.

While some specific operational procedures may be applied in order to reduce fouling (turbulent conditions, for instance with air bubbles flux, periodic backwash, treatment with chemical cleaning agents), these mitigating actions make operations more complex and economically burdensome and may, especially in the case of chemical cleaning, have negative effects on the durability of membrane materials.

Approaches have been thus developed for preventing fouling mechanism by modifying the membrane material itself, for increasing its hydrophilicity, e.g. by surface coating, surface grafting or blending.

For instance, WO 2008/129041 (SOLVAY SOLEXIS S.P.A.) 30 Oct. 2008 discloses linear semi-crystalline copolymers of vinylidene fluoride comprising from 0.05% to 10% by moles of recurring units derived from hydrophilic (meth)acrylic monomers, said copolymers having a random distribution of the recurring units derived from said (meth) acrylic monomers throughout the whole vinylidene fluoride backbone, said copolymers being notably suitable for the manufacture of hydrophilic membranes.

Also, MENG, Fangang, et al. Recent advances in membrane bioreactors (MBRs): membrane fouling and membrane material. *Water Research*. 2009, vol. 43, p. 1489-1512. discloses PVDF ultrafiltration membranes coated with polyvinyilidene fluoride-graft-polyoxyethylene methacrylate copolymer.

Further, LIU, Fu, et al. Preparation of hydrophilic and fouling resistant poly(vinylidene fluoride) hollow fiber membranes. *Journal of Membrane Science*. 2009, vol. 345, p. 331-339. discloses PVDF hollow fiber membranes blended with random copolymer of methyl methacrylate with poly(ethylene glycol)methyl ether methacrylate.

There is nevertheless still a current shortfall in the art for alternative vinylidene fluoride polymers exhibiting outstanding hydrophilic surface properties, while maintaining the other outstanding properties of the vinylidene fluoride polymers, e.g. thermal stability and mechanical properties, and which can be manufactured in an easy manner, without involvement of subsequent grafting or blending or otherwise chemical modification. Similarly, there is a need in the art for innovative manufacturing process enabling preparation of such materials.

SUMMARY OF INVENTION

The present invention advantageously solves the above mentioned problems by firstly providing a process for the manufacture of a grafted fluorinated polymer comprising at least one grafted side chain comprising one or more glycosidic recurring units [polymer (F)], said process comprising polymerizing:
- vinylidene fluoride (VDF),
- optionally, one or more other fluorinated monomers [monomers (F)], and
- optionally, one or more (meth)acrylic monomers [monomers (MA)], in the presence of at least one polysaccharide derivative [derivative (P)], said polysaccharide derivative having a dynamic viscosity of less than 15 mPa×s, as measured according to ASTM D445 at 20° C. in an aqueous solution at a concentration of 2% by weight, and by further providing novel polymers (F) as defined above.

The Applicant has surprisingly found that the fluorinated polymer obtained according to the simple and one-step process as above detailed successfully exhibits the targeted hydrophilic surface properties, while maintaining all outstanding mechanical and thermal behaviour typical of PVDF.

The term "fluorinated monomer [monomer (F)]" is hereby intended to denote an ethylenically unsaturated monomer comprising at least one fluorine atom.

The monomer (F) may further comprise one or more other atoms such as hydrogen, chlorine, bromine and iodine.

Non-limitative examples of suitable monomers (F) include, notably, the followings:

(i) $C_2$-$C_8$ fluoroolefins such as trifluoroethylene (TrFE), tetrafluoroethylene (TFE) and hexafluoropropylene (HFP);

(ii) perfluoroalkylethylenes of formula $CH_2=CH-R_{f0}$, wherein $R_{f0}$ is a $C_2$-$C_6$ perfluoroalkyl group;

(iii) chloro- and/or bromo- and/or iodo-$C_2$-$C_6$ fluoroolefins such as chlorotrifluoroethylene (CTFE);

(iv) perfluoroalkylvinylethers of formula $CF_2=CFOR_{f1}$, wherein $R_{f1}$ is a $C_1$-$C_6$ perfluoroalkyl group, such as perfluoromethylvinylether (PMVE) and perfluoropropylvinylether (PPVE);

(v) (per)fluorooxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(vi) (per)fluoroalkylvinylethers of formula $CF_2=CFOCF_2OR_{f2}$, wherein $R_{f2}$ is a $C_1$-$C_6$ (per)fluoroalkyl group, e.g. $-CF_3$, $-C_2F_6$, $-C_3F_7$, or a $C_1$-$C_6$ (per)fluorooxyalkyl group having one or more ether groups, e.g. $-C_2F_5-O-CF_3$;

(vii) functional (per)fluorooxyalkylvinylethers of formula $CF_2=CFOY_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;

(viii) fluorodioxoles, especially perfluorodioxoles;

(ix) vinyl fluoride.

Most preferred fluorinated monomers (F) are chlorotrifluoroethylene (CTFE), trifluoroethylene (TrFE), tetrafluoroethylene (TFE), hexafluoropropylene (HFP), perfluoromethylvinylether (PMVE).

The (meth)acrylic monomer [monomer (MA)] typically complies with formula (I) here below:

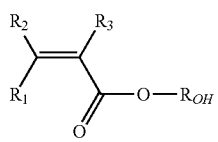
(I)

wherein:
$R_1$, $R_2$ and $R_3$, equal to or different from each other, are independently selected from a hydrogen atom and a $C_1$-$C_3$ hydrocarbon group, and
$R_{OH}$ represents a hydrogen atom or a $C_1$-$C_5$ hydrocarbon moiety comprising at least one hydroxyl group.

The (meth)acrylic monomer [monomer (MA)] preferably complies with formula (II) here below:

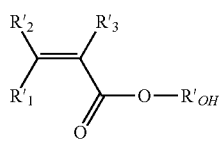
(II)

wherein:
$R'_1$ and $R'_2$, equal to or different from each other, are independently selected from a hydrogen atom and a $C_1$-$C_3$ hydrocarbon group, preferably $R'_1$ and $R'_2$ being hydrogen atoms,
$R'_3$ is a hydrogen atom, and
$R'_{OH}$ represents a hydrogen atom or a $C_1$-$C_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylates.

The monomer (MA) is more preferably selected from the followings:
hydroxyethylacrylate (HEA) of formula:

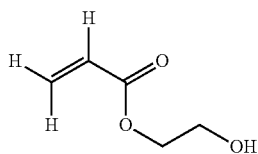

2-hydroxypropyl acrylate (HPA) of either of formulae:

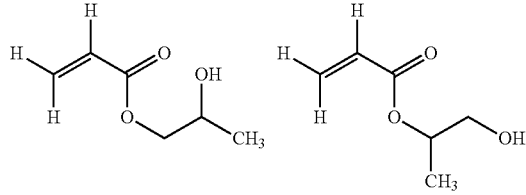

acrylic acid (AA) of formula:

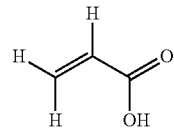

and mixtures thereof.

The monomer (MA) is even more preferably acrylic acid (AA) or hydroxyethylacrylate (HEA).

The term "polysaccharide derivative [derivative (P)]" is hereby intended to denote a derivative of a polysaccharide polymer comprising as recurring units one or more glycosidic units linked to each other by glycosidic bonds.

Glycosidic units are hereby intended to denote either six-membered pyranoside rings as represented by formula (III) here below or five-membered furanoside rings as represented by formula (IV) here below, wherein —OR represents a glycosidic bond and R represents a glycosidic unit as defined above:

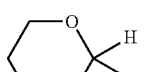
(III)

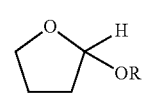
(IV)

Non-limitative examples of suitable six-membered pyranosides include, notably, D-glucopyranosides such as α-D-glucopyranosides as represented by formula (III-a) here below, wherein —$OR_a$ is a α-glycosidic bond, $R_a$ is a glycosidic unit as defined above and R', equal to or different from each other, represent a hydrogen atom or a hydrocarbon group, and β-D-glucopyranosides as represented by formula (III-b) here below, wherein —$OR_b$ is a β-glycosidic bond, $R_b$ is a glycosidic unit as defined above and R', equal to or different from each other, represent a hydrogen atom or a hydrocarbon group:

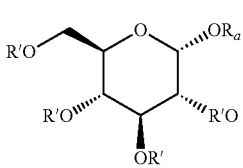
(III-a)

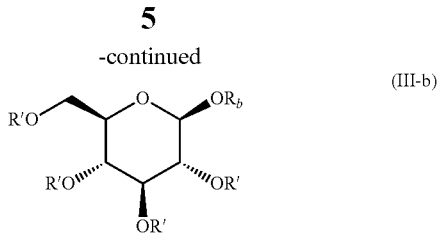

Polysaccharide derivatives comprising as recurring units glycosidic units selected from D-glucopyranosides linked to each other by glycosidic bonds, said polysaccharide derivatives having a dynamic viscosity of less than 15 mPa×s, as measured according to ASTM D445 at 20° C. in an aqueous solution at a concentration of 2% by weight, have been found useful in the process of the invention.

Preferred polysaccharide derivatives include, notably, cellulose derivatives comprising as recurring units β-D-glucopyranosides of formula (III-b) as described above linked to each other by β-glycosidic bonds, said polysaccharide derivatives having a dynamic viscosity of less than 15 mPa×s, as measured according to ASTM D445 at 20° C. in an aqueous solution at a concentration of 2% by weight.

Most preferred polysaccharide derivatives include, notably, cellulose ethers wherein one or more —OH groups are converted into ether groups having formula —OR", wherein R" is selected from —CH$_3$, —CH$_2$CH$_3$, —CH$_2$ CH(OH) CH$_3$, —CH$_2$CH(OCH$_3$)CH$_3$, —(CH$_2$CH$_2$O)$_x$— CH$_2$CH$_2$OH, —(CH$_2$ CH(CH$_3$)O)$_x$—CH$_2$CH(CH$_3$)OH, wherein x is an integer of at least 1, said cellulose ethers having a dynamic viscosity of less than 15 mPa×s, as measured according to ASTM D445 at 20° C. in an aqueous solution at a concentration of 2% by weight.

The polysaccharide derivative used in the process of the invention preferably has a dynamic viscosity of at most 12 mPa×s, more preferably of at most 6 mPa×s, as measured according to ASTM D445 at 20° C. in an aqueous solution at a concentration of 2% by weight.

The polysaccharide derivative used in the process of the invention preferably has a dynamic viscosity of at least 0.1 mPa×s, more preferably of at least 0.5 mPa×s, as measured according to ASTM D445 at 20° C. in an aqueous solution at a concentration of 2% by weight.

Very good results have been obtained with polysaccharide derivatives having a dynamic viscosity comprised between 2 and 10 mPa×s, as measured according to ASTM D445 at 20° C. in an aqueous solution at a concentration of 2% by weight.

Non-limitative examples of polysaccharide derivatives suitable for the process of the invention include, notably, cellulose derivatives available under the trademark names METHOCEL™ K3 having a dynamic viscosity of 2.4-3.8 mPa×s at 20° C. in an aqueous solution at a concentration of 2% by weight and CULMINAL® MHPC5 having a dynamic viscosity of 4-8 mPa×s at 20° C. in an aqueous solution at a concentration of 2% by weight.

The process of the invention is typically carried out in an aqueous medium in the presence of a radical initiator.

The process of the invention is carried out at temperatures of typically at least 10° C., preferably of at least 25° C., more preferably of at least 45° C.

The pressure is typically maintained at a value of more than 50 bar, preferably of more than 75 bar, even more preferably of more than 100 bar.

While the choice of the radical initiator is not particularly limited, it is understood that those suitable for the process according to the invention are selected from compounds capable of initiating and/or accelerating the polymerization process.

Among radical initiators which may advantageously be used in the process of the invention, mention can be made of organic radical initiators. Non-limitative examples of suitable organic radical initiators include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile); tert-butylperpivalate; tert-amylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2-ethylhexanoate; tert-butylpermaleate; 2,2'-azobis(isobutyronitrile); bis(tert-butyl peroxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

One or more suspension stabilizers may also advantageously be used in the process of the invention. Suspension stabilizers useful in the process of the invention include, notably, polysaccharide derivatives, more precisely cellulose ether derivatives as notably described in EP 0417585 A (SOLVAY & CIE SOCIETE ANONYME) 20 Mar. 1991 and U.S. Pat. No. 5,145,921 (SOLVAY & CIE SOCIETE ANONYME) 8 Sep. 1992 and polyvinyl alcohols such as those available under the trademark names ALCOTEX®.

When a polysaccharide derivative is used as suspension stabilizer, it is generally understood that those which are more effective are those having higher dynamic viscosities. According to these embodiments, it is generally understood that the process will be carried out in the presence of more than one polysaccharide derivatives, at least one of said polysaccharide derivatives having a dynamic viscosity of at least 15 mPa×s, and at least one of said polysaccharide derivatives having a dynamic viscosity of less than 15 mPa×s, as measured according to ASTM D445 at 20° C. in an aqueous solution at a concentration of 2% by weight.

Non-limitative examples of suspension stabilizers having dynamic viscosity, as above detailed, of at least 15 mPa×s, which have been found suitable for the process of the invention, include, notably, cellulose ethers available as METHOCEL™ K100 having a dynamic viscosity of 80-120 mPa×s at 20° C. in an aqueous solution at a concentration of 2% by weight and CULMINAL® MHPC100 having a dynamic viscosity of 90-125 mPa×s at 20° C. in an aqueous solution at a concentration of 2% by weight.

According to a preferred embodiment of the process of the invention, the process is carried out by polymerizing VDF in the presence of at least one polysaccharide derivative having a dynamic viscosity of less than 15 mPa×s, as measured according to ASTM D445 at 20° C. in an aqueous solution at a concentration of 2% by weight.

According to a more preferred embodiment of the process of the invention, the process is carried out by polymerizing VDF in the presence of at least one cellulose derivative having a dynamic viscosity of less than 15 mPa×s, as measured according to ASTM D445 at 20° C. in an aqueous solution at a concentration of 2% by weight.

A grafted fluorinated polymer [polymer (F)] is obtained by the process of the present invention, said polymer comprising:

a main chain comprising recurring units derived from vinylidene fluoride (VDF), optionally, recurring units derived from one or more other fluorinated monomers [monomers (F)] as defined above and, optionally, recurring units derived from one or more (meth)acrylic monomers [monomers (MA)] as defined above, and at least one side chain grafted to said main chain, said grafted side chain comprising one ore more glycosidic recurring units as defined above.

Said grafted fluorinated polymer is another object of the present invention.

The Applicant thinks, without this limiting the scope of the invention, that the polysaccharide derivative [derivative (P)] is degraded under the process of the invention so that one or more glycosidic recurring units deriving therefrom are polymerized together with vinylidene fluoride (VDF) and, optionally, with one or more other fluorinated monomers [monomers (F)] as defined above and, optionally, with one or more (meth)acrylic monomers [monomers (MA)] to yield the grafted fluorinated polymer [polymer (F)] of the invention.

The polymer (F) of the present invention advantageously comprises at least 40 ppm, preferably at least 50 ppm, more preferably at least 60 ppm of hydrogen atoms of one or more glycosidic recurring units in at least one grafted side chain of polymer (F) with respect to the total amount of hydrogen atoms of VDF recurring units in the main chain of polymer (F).

Determination of the amount of glycosidic recurring units in the polymer (F) can be performed by any suitable method. Mention can be notably made of NMR techniques, in particular $^1$H-NMR technique, according to standard methods.

The Applicant has found that the polymer (F) of the invention successfully exhibits hydrophilic surface properties, even at low levels of glycosidic recurring units in the vinylidene fluoride polymer, without impairing the other outstanding properties of the vinylidene fluoride polymers, e.g. thermal stability and mechanical properties.

Should one or more monomers (F) be present, the polymer (F) of the invention comprises a main chain comprising typically from 0.5% to 20% by moles, preferably from 2% to 18% by moles, more preferably from 4% to 15% by moles, with respect to the total number of moles of the polymer (F), of recurring units derived from said monomers (F).

Should one or more monomers (MA) be present, the polymer (F) of the invention comprises a main chain comprising typically from 0.1% to 10% by moles, preferably from 0.5% to 5% by moles, with respect to the total number of moles of the polymer (F), of recurring units derived from said monomers (MA).

The polymer (F) of the invention preferably comprises:

a main chain comprising recurring units derived from VDF, optionally, recurring units derived from one or more other fluorinated monomers [monomers (F)] as defined above and, optionally, recurring units derived from one or more (meth)acrylic monomers [monomers (MA)] as defined above, and at least one side chain grafted to said main chain, said grafted side chain comprising one or more β-D-glucopyranosides of formula (III-b) as described above linked to each other by β-glycosidic bonds.

The polymer (F) of the invention more preferably comprises:

a main chain comprising recurring units derived from VDF, optionally, recurring units derived from one or more other fluorinated monomers [monomers (F)] as defined above and, optionally, recurring units derived from one or more (meth)acrylic monomers [monomers (MA)] as defined above, and at least one side chain grafted to said main chain, said grafted side chain comprising at least 65 ppm of hydrogen atoms of one or more β-D-glucopyranosides of formula (III-b) as described above with respect to the total amount of hydrogen atoms of VDF recurring units in the main chain of polymer (F), said β-D-glucopyranosides being linked to each other by β-glycosidic bonds.

The polymer (F) of the invention is advantageously endowed with an intrinsic viscosity higher than 0.01 l/g, preferably higher than 0.05 l/g, more preferably higher than 0.1 l/g, as measured at 25° C. in dimethylformamide.

The polymer (F) of the invention is advantageously endowed with an intrinsic viscosity lower than 70 l/g, preferably lower than 50 l/g, more preferably lower than 30 l/g, as measured at 25° C. in dimethylformamide.

Another object of the invention of a composition (C) comprising polymer (F) as defined above and at least one VDF polymer.

The term "VDF polymer" is hereby intended to denote a polymer comprising at least 70% by moles of recurring units derived from VDF and, optionally, up to 30% by moles of recurring units derived from at least one other suitable fluorinated monomer [monomer (F)] as defined above.

A VDF homopolymer is particularly advantageous for the compositions of the invention.

The composition (C) of the invention advantageously comprises at least 5% by weight, preferably at least 10% by weight, more preferably at least 30% by weight of polymer (F).

Thus, the composition (C) can be notably used for achieving the target properties of hydrophilicity provided by the polymer (F) component, by reducing the required amount of highly valuable polymer (F), by dilution with a VDF polymer.

Still, another object of the invention is the use of the polymer (F) or of composition (C) as defined above for the manufacture of a hydrophilic membrane.

The present invention thus pertains to a process for the manufacture of a hydrophilic membrane comprising polymer (F) or composition (C), and to the hydrophilic membrane comprising polymer (F) or composition (C) as defined above.

The above detailed use for the manufacture of hydrophilic membrane, process and membrane therefrom will be described in detail in relation with polymer (F); it is nevertheless understood that the composition (C) as above detailed can be used in lieu of polymer (F) in all the embodiments detailed here below.

To the purpose of the invention, the term "membrane" possesses its usual meaning, that is to say it refers, in essence, to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane). The terms "pore", "void" and "hole" will be used as synonymous within the context of the present invention.

The membrane of the invention is preferably a porous membrane. A porous membrane possesses generally a voided structure with interconnected pores.

Porous membranes are generally characterized by the average pore diameter (d) and the porosity ($\epsilon$), i.e. the fraction of the total membrane that is porous.

The porous membrane of the invention has a porosity ($\epsilon$) of advantageously at least 1%, preferably of at least 2%, more preferably of at least 3% and advantageously of at most 90%, preferably of at most 80%. These pores have generally an average diameter (d) of advantageously at least 0.01 μm, preferably of at least 0.05 μm, more preferably of at least 0.1 μm and advantageously of at most 50 μm, preferably of at most 25 μm, more preferably of at most 10 μm.

The membrane can be under the form of a flat-sheet or can be produced under the form of thin tubes or fibers (hollow-fiber membranes). Flat-sheet membranes are generally preferred when high fluxes are required. Formation of membrane into hollow fibers is particularly advantageous when compact modules with high surface areas are required.

The membranes of the invention can be used in the chemical processing industry in various separation processes, such as microfiltration and preferably ultrafiltration, in particular of aqueous media, in biomedical applications, e.g. for haemodialysis, for controlled release of drugs, for artificial organs, such as kidney, lung and pancreas, and in membrane bioreactors for municipal and industrial wastewater treatments.

The skilled in the art is aware of suitable standard technique which will enable him to process the polymer (F) having outstanding hydrophilicity surface properties to obtain the membrane having the porosity and the average pore diameter required.

Should the membrane be a dense membrane, the process of the invention advantageously comprises casting and/or melt forming the polymer (F) as defined above. Melt forming is commonly used to make dense membranes either by extrusion as a sheet from a die or as a blown film.

Should the membrane be a porous membrane, the process of the invention advantageously comprises at least one step including one of irradiation technique, film expansion, template leaching technique, solution precipitation technique, electrospinning technique.

According to the irradiation technique, a film of the polymer (F) as defined above made by conventional techniques is first irradiated with charged particles from a suitable radiation source, said particles typically breaking polymer chains and leaving sensitized/damaged tracks; then said irradiated film is passed through a suitable etch solution etching preferentially along the sensitized tracks, thereby forming pores.

In the film expansion, porous membranes are prepared by subsequent orientation and stretching; thus an oriented film of the polymer (F) as defined above is typically extruded under drawdown; after cooling, the film is advantageously stretched at right angle to the original orientation, so that the crystalline structure of the polymer is typically deformed and slit-like voids are advantageously formed.

According to the template leaching technique, a homogeneous film is prepared from a mixture of the membrane material (i.e. the polymer (F) as defined above) and a leachable component. After the film has been formed, the leachable component is removed with a suitable solvent and a porous membrane is formed. The leachable component could be a soluble low molecular weight solid or liquid, such as a plasticizer, a low molecular weight VDF polymer, and the like.

In the solution precipitation technique, a clear solution comprising the polymer (F) as defined above is precipitated into two phases, namely a solid, polymer-rich phase which forms the matrix of the membrane and a liquid, polymer-poor phase that forms the membrane pores. Said polymer precipitation from solution can be achieved in several ways, such as cooling, solvent evaporation, precipitation by immersion in a non-solvent, imbibition of a non-solvent from the vapour phase.

Casting generally involves solution casting, wherein typically a casting knife or draw-down bar is used to spread an even film of an appropriate polymer solution of the polymer (F) as defined above across a suitable support. After the casting has been made, the solvent generally evaporates to leave a uniform dense membrane.

According to a preferred embodiment of the invention, the process comprises at least one step including template leaching technique.

According to this preferred embodiment of the invention, 100 wt. parts of a thermoplastic composition (TC) comprising polymer (F) as defined above is mixed with 50-250 wt. parts of one or more plasticizers and, optionally, 0-80 wt. parts of a good solvent for said polymer (F) to provide a mixture (Mx); said mixture (Mx) is processed into a film; the film is then subjected to extraction of the plasticizer (and optionally of the good solvent) by a suitable extraction solvent.

As the plasticizer, hydrogenated plasticizers may generally be used. Esters or polyesters such as citrates, phthalates, trimellitates, sabacates, adipates, azelates can be notably mentioned. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; azelaic acid-based polyesters of e.g., the azelaic acid-propylene glycol type, and azelaic acid-1,3-butylene glycol type; alkyl phthalates like, e.g. di(2-ethyl hexyl) phthalate, diisononyl phthalate, diisodecyl phthalate; alkyl and acyl citrates, e.g. triethyl citrate, acetyl triethyl citrate, tri-n-butyl citrate, acetyl-tri-n-butyl citrate, trioctyl citrate, acetyl-tri-octyl citrate trihexyl citrate, acetyl-trihexyl citrate, butyryl-trihexyl citrate or trihexyl-o-butyryl citrate; alkyl trimeliltates, like notably trimethyl trimellitate, tri-(2-ethylhexyl)trimellitate, tri-(n-octyl,n-decyl)trimellitate tri-(heptyl,nonyl)trimellitate, n-octyl trimellitate.

As the good solvent for polymer (F), those capable of dissolving polymer (F) in a temperature range of 20-250° C. may be used. Examples thereof may include the followings: N-methylpyrrolidone, N,N-dimethylformamide, N,N-dimethylacetamide, dimethyl sulfoxide, methyl ethyl ketone, acetone, tetrehydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

A good solvent for polymer (F) is particularly advantageous when the mixture (Mx) is processed by casting, as it can advantageously help in tuning the viscosity of said mixture (Mx).

The so obtained mixture (Mx) can be processed by extrusion moulding, injection moulding, compression moulding and/or casting to yield a film, so as to obtain advantageously the desired shape to the membrane.

Then the so obtained film is dipped into an extraction solvent to extract the plasticizer and optionally the good solvent. It is possible to carry out the extraction at room temperature obtaining a complete plasticizer extraction in a time ranging from some minutes to some hours, depending on the thickness, the nature of the extraction solvent and the agitation. Generally times of few minutes are sufficient to completely extract the plasticizer. After extraction a porous membrane is obtained.

As extraction solvents, solvents wherein the plasticizer is soluble, but which are not compatible with the polymer (F), so as not to cause the swelling thereof, are generally used.

The most commonly used class of solvents is that of aliphatic alcohols, preferably having a short chain, for example from 1 to 6 carbon atoms, more preferably methanol and isopropanol.

It is also understood that the polymer (F) can be used for the manufacture of a hydrophilic membrane either alone, as unique thermoplastic polymer component or in admixture with another suitable thermoplastic polymer.

Particularly advantageous to the purposes of the invention is a composition comprising polymer (F) and at least one VDF polymer, i.e. the composition (C) of the invention as defined above.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Determination of Hydrogen Content of Grafted Glycosidic Recurring Units in VDF Polymer The amount of grafted glycosidic recurring units in the polymer was determined by $^1$H-NMR technique. About 20 mg of polymer powder, previously washed with ethanol and dried, were dissolved in 0.6 ml of hexadeuteroacetone and then analyzed with NMR spectrometer.

The $^1$H-NMR spectrum revealed signals related to —OCH$_3$ and —CH— of the glycosidic recurring units at about 3.5-3.6 ppm and signals related to —CH$_2$-moieties of the VDF recurring units at about 2.5 and 3 ppm.

The hydrogen content (in ppm) belonging to the grafted glycosidic recurring units was determined with respect to the hydrogen content of VDF recurring units in the main chain of the polymer (see Table 2 here below).

Determination of Hydrophilicity of VDF Polymer 4 g of polymer powder were dispersed in 40 ml of demineralized water in a beaker glass by magnetic stirring during 1 minute. After 1 minute of ultrasonic dispersion, the suspension was left at rest overnight and separated into two phases. The two phases were separated, dried and weighted.

The weight percentages of these two dried phases were measured (see Table 2 here below).

It is essential that the weight percentage of the dried phase at the bottom of the beaker is at least 50% by weight with respect to the total weight of the two dried phases so that the polymer (F) of the invention exhibits satisfactory hydrophilic surface properties, even at low levels of grafted glycosidic units in one or more side chains of said polymer (F).

EXAMPLES 1-3

Manufacture of Polymer (F)

In a 4 liter reactor equipped with an impeller running at a speed of 880 rpm were subsequently introduced 2050 g of demineralized water, METHOCEL™ K3 cellulose ether and, optionally, METHOCEL™ K100 in the amounts as detailed in Table 1 here below.

The reactor was then repeatedly evacuated and purged with nitrogen (1 bar) while maintaining the temperature at 14° C. Then, 24.5 g of diethylcarbonate/kg of VDF fed, 1 g/kg of VDF fed of a 75% by weight solution of tert-amyl perpivalate radical initiator in isododecane and 1346 g of VDF were introduced into the reactor. The reactor was then gradually heated until the set-point temperature of 52° C. was attained, which corresponded to a pressure of 120 bar. The pressure was kept constantly equal to 120 bar during the whole polymerization run by feeding water. After conversion of about 80-90% of the VDF, the polymerization was stopped by degassing the suspension until reaching atmospheric pressure. The polymer was then collected by filtration, washed with demineralized water and oven-dried at 50° C.

A polymer was obtained having an intrinsic viscosity of 0.15 l/g at 25° C. in dimethylformamide and a particle size of about 100-120 μm (D50).

COMPARATIVE EXAMPLE 1

Manufacture of VDF Homopolymer

The same procedure as detailed in Examples 1 to 3 according to the invention was followed but without using a polysaccharide derivative having a dynamic viscosity of less than 15 mPa×s, as measured according to ASTM D445 at 20° C. in an aqueous solution at a concentration of 2% by weight (see Table 1 here below).

The amounts of METHOCEL™ K3 cellulose ether and, optionally, of METHOCEL™ K100 suspension stabilizer fed to the polymerization reactor are reported in Table 1 here below:

TABLE 1

| Run | METHOCEL ™ K3 [g/Kg VDF fed] | METHOCEL ™ K100 [g/Kg VDF fed] |
| --- | --- | --- |
| Example 1 | 0.5 | 0.4 |
| Example 2 | 2.5 | — |
| Example 3 | 5.0 | — |
| Comparative Example 1 | — | 0.4 |

The results of the hydrophilicity tests as detailed above are reported in Table 2 here below:

TABLE 2

| Run | $H_{grafted\ glycosidic\ units}/H_{VDF\ polymer}$ [ppm] | Bottom phase [% by weight] | Top phase [% by weight] |
| --- | --- | --- | --- |
| Example 1 | 69 ppm | 66% | 34% |
| Example 2 | 139 ppm | 94% | 6% |
| Example 3 | 252 ppm | 87% | 13% |
| Comparative Example1 | — | 36% | 64% |

Data shown in Table 2 here above demonstrated that the polymer obtained by the process of the invention is successfully grafted with one or more glycosidic recurring units in an amount of advantageously at least 40 ppm, preferably at least 50 ppm, more preferably at least 60 ppm of hydrogen atoms with respect to the total amount of hydrogen atoms of VDF recurring units in the main chain of polymer (F), even at low levels of glycosidic recurring units grafted to VDF polymer main chain, so that the polymer so obtained successfully exhibits the targeted hydrophilic surface properties, while maintaining outstanding mechanical and thermal stability typical of PVDF.

The invention claimed is:

1. A process for the manufacture of a grafted fluorinated polymer comprising at least one grafted side chain comprising one or more glycosidic recurring units [polymer (F)], said process comprising polymerizing:
   vinylidene fluoride (VDF),
   optionally, one or more other fluorinated monomers, and
   optionally, one or more (meth)acrylic monomers,
   in the presence of at least one polysaccharide derivative, said polysaccharide derivative having a dynamic viscosity of at most 12 mPa×s, as measured according to ASTM D445 at 20° C. in an aqueous solution at a concentration of 2% by weight.

2. The process of claim 1, wherein the polysaccharide derivative comprises as recurring units glycosidic units selected from the group consisting of D-glucopyranosides linked to each other by glycosidic bonds.

3. The process of claim 1, wherein the polysaccharide derivative is selected from the group consisting of cellulose derivatives comprising as recurring units β-D-glucopyranosides of formula (III-b) linked to each other by β-glycosidic bonds, wherein —OR$_b$ is a β-glycosidic bond, R$_b$ is a glycosidic unit and R', equal to or different from each other, represent a hydrogen atom or a hydrocarbon group:

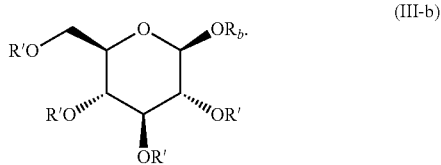

(III-b)

4. The process of claim 1, wherein the polysaccharide derivative has a dynamic viscosity comprised between 2 and 10 mPa×s, as measured according to ASTM D445 at 20° C. in an aqueous solution at a concentration of 2% by weight.

5. The process of claim 1, wherein one or more suspension stabilizers are used.

6. A fluorinated polymer [polymer (F)] comprising:
   a main chain comprising recurring units derived from vinylidene fluoride (VDF), optionally, recurring units derived from one or more other fluorinated monomers—and, optionally, recurring units derived from one or more (meth)acrylic monomers, and
   at least one side chain grafted to said main chain, said grafted side chain comprising one or more glycosidic recurring units.

7. The polymer of claim 6, comprising at least 40 ppm of hydrogen atoms of one or more glycosidic recurring units in at least one grafted side chain of polymer (F) with respect to the total amount of hydrogen atoms of VDF recurring units in the main chain of polymer (F).

8. The polymer of claim 6, wherein at least one side chain comprises one or more β-D-glucopyranosides of formula (III-b)

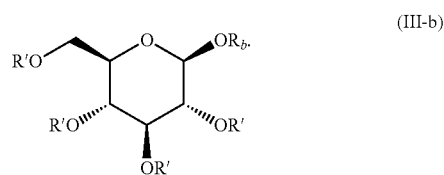

(III-b)

wherein —OR$_b$ is a β-glycosidic bond, R$_b$ is a glycosidic unit and R', equal to or different from each other, represent a hydrogen atom or a hydrocarbon group and wherein the β-D-glucopyranosides of formula (III-b) are linked to each other by β-glycosidic bonds.

9. A composition comprising the polymer of claim 6 and at least one VDF polymer.

10. A hydrophilic membrane comprising the polymer of claim 6 or the composition of claim 9.

11. The polymer of claim 7, comprising at least 50 ppm of hydrogen atoms of one or more glycosidic recurring units in at least one grafted side chain of polymer (F) with respect to the total amount of hydrogen atoms of VDF recurring units in the main chain of polymer (F).

12. The polymer of claim 7, comprising at least 60 ppm of hydrogen atoms of one or more glycosidic recurring units in at least one grafted side chain of polymer (F) with respect to the total amount of hydrogen atoms of VDF recurring units in the main chain of polymer (F).

13. The polymer of claim 6, wherein the glycosidic recurring units comprise one or more —OH groups that have been converted into ether groups of formula —OR", wherein R" is selected from the group consisting of —CH$_2$CH(OH)CH$_3$, —CH$_2$CH(OCH$_3$)CH$_3$ and —(CH$_2$CH(CH$_3$)O)$_x$—CH$_2$CH(CH$_3$)OH, wherein x is an integer of at least 1.

14. The process of claim 1, wherein the polysaccharide derivative has a dynamic viscosity of at most 6 mPa×s, as measured according to ASTM D445 at 20° C. in an aqueous solution at a concentration of 2% by weight.

15. The process of claim 1, wherein the glycosidic recurring units comprise one or more —OH groups that have been converted into ether groups of formula —OR", wherein R" is selected from the group consisting of —CH$_2$CH(OH)CH$_3$, —CH$_2$CH(OCH$_3$)CH$_3$ and —(CH$_2$CH(CH$_3$)O)$_x$—CH$_2$CH(CH$_3$)OH, wherein x is an integer of at least 1.

* * * * *